United States Patent [19]
Leonard

[11] 3,728,462
[45] Apr. 17, 1973

[54] HOLDER AND GUIDE FOR WRITING AND READING MUSIC

[76] Inventor: Verna M. Leonard, 6353 N. Blackstone, Fresno, Calif. 93721

[22] Filed: Apr. 13, 1972

[21] Appl. No.: 243,892

Related U.S. Application Data

[63] Continuation of Ser. No. 43,907, June 5, 1970.

[52] U.S. Cl. ................................. 84/471, 283/47
[51] Int. Cl. ............................................. G09b 15/02
[58] Field of Search ............................. 84/470–483; 235/85, 89, 70; 283/47

[56] References Cited

UNITED STATES PATENTS

| | | | |
|---|---|---|---|
| 373,069 | 11/1887 | Hill | 84/471 |
| 979,193 | 12/1910 | Nelson | 84/86 |
| 1,172,848 | 2/1916 | Valetine | 35/12 |
| 3,375,748 | 4/1968 | Aaron | 84/471 |

*Primary Examiner*—Richard B. Wilkinson
*Assistant Examiner*—Lawrence R. Franklin
*Attorney*—Knox & Knox

[57] ABSTRACT

A staff paper holder and guide for semi-skilled musicians such as rock and roll devotees having musical talent but little formal music education. When placed in front of the user either on a writing surface or a music rack the left hand edge has a flap to accept an edge of staff paper and the flap has indicia thereon identifying by name the lines and spaces of the staff paper, including ledger lines, critically positioned so that juxtaposition of the staff paper with the indicia is more or less automatically achieved. The holder includes a pocket and a replaceable card with indicia thereon to guide the user in reading and playing the written music to secure a proper base beat.

2 Claims, 3 Drawing Figures

HOLDER AND GUIDE FOR WRITING AND READING MUSIC

This is a continuation of application Ser. No. 43,907, filed June 5, 1970.

BACKGROUND OF THE INVENTION

Prior art includes many teaching aids, music holders usually with separate instruction literature. These prior devices when in rack form support sheet music, sometimes in juxtaposition to instructional matter, any naming of lines and spaces ordinarily being superimposed on regularly printed music sheets with the indicia necessarily small in size, irregularly spaced over the sheet and as a result somewhat difficult for the user to read and interpret quickly. The naming of chords and the notation of the time and counting is not new and, of course, representation of ledger lines on the printed sheet and the naming thereof is very old and accepted procedure. With the advent of thousands of young persons interested in recording their own melodies, improvisations and, particularly, a desired bass chord accent, pulse or beat, yet without great knowledge of music theory and notation, a need has arisen for a simple guide to assist in "getting it down on paper" before it is forgotten and with a proper indication of the specific bass chord and beat. The requirement that the written record has to be easily followed by a reader-player is an obvious corollary.

SUMMARY OF THE INVENTION

As an answer to the foregoing need or problem, the instant invention is a combined holder and guide for use in writing music and later reading of the writer's music. As placed in front of the user the holder has a flap at the left to receive an edge of a sheet of staff paper, the lower edge, or the edge toward the user, being critically related to the staff line positioning and the flap carrying indicia with lead lines fanning out in such a manner that indicia used to name the lines can be large permitting easy and quick comprehension during both writing and reading reference thereto by the user.

DETAILED DESCRIPTION OF A PREFERRED EMBODIMENT

Figure 1:
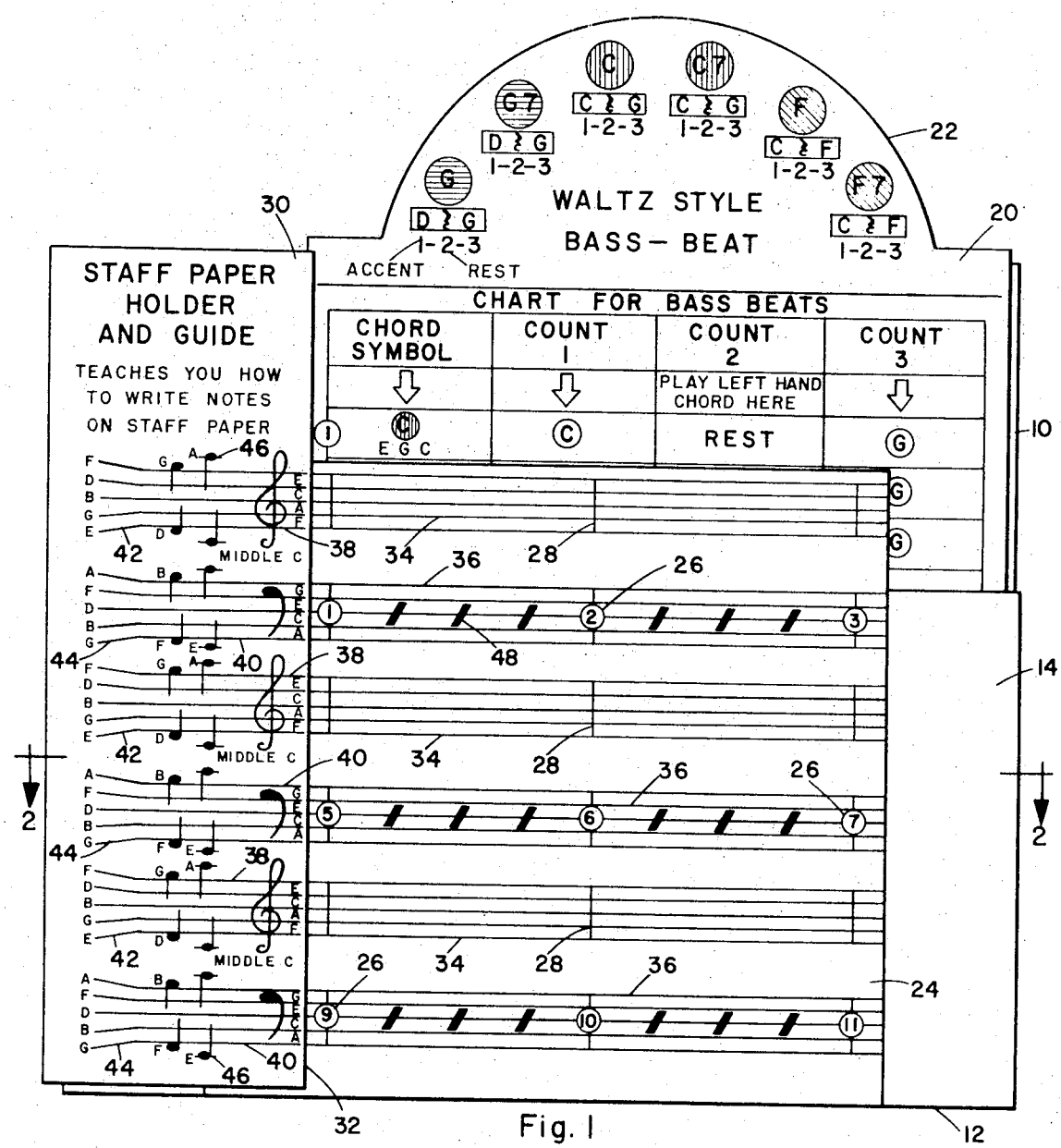
FIG. 1 is a front elevational view of the holder and guide with a guide sheet in the pocket and with a sheet of staff paper placed with its left hand edge operatively positioned behind the flap, the sheet of staff paper being shown as folded rearwardly so that only the left hand portion thereof is visible in this figure.

A panel 10 of sheet material, ordinarily paper, may be considered for purposes of this description as having a lower edge 12 and a returned portion forming a pocket 14. The left edge 16 of the portion forming the pocket is adhered to the panel 10 as shown best in FIG. 2, and the right hand edge 18 is folded around and secured to the panel as also illustrated in FIG. 2.

The pocket may be used for various purposes but in this embodiment represented as holding a single guide sheet 20, the upper portion only of which is shown as exposed above the pocket 14. This guide sheet is constructed of sheet material and may preferably be sturdy enough to be substantially free standing well above the pocket 14 when intentionally pulled upward to make at least the upper portion 22 thereof visible to the user. This upper portion 22 is shown as semi-annular and carries information not ordinarily included on sheet music such as the illustrated chord progression, and bass beat guide for a particular kind of music correlated with staff paper of a type particularly suitable for use with the instant holder and guide.

Figure 2:
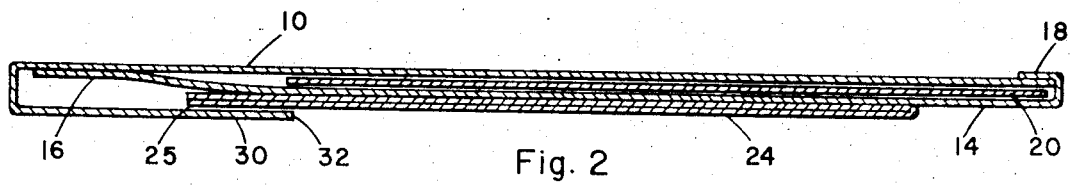
FIG. 2 is a horizontal sectional view taken on the line 2—2 in FIG. 1.

This staff paper 24 is shown folded on itself but it will be understood that the part indicated at 25 in FIG. 2 may be unfolded to extend well to the right of the panel 10 and the measures 3–4, 7–8 and 11–12 will then be fully visible, like the numbered bars or measures 26 depicted in FIG. 1. It will be noted that the numerals of the measures appear in the bass only with bar lines 28 on the corresponding bars or measures in the treble staff lines so that the numerals in the bass clef actually function for both bass and treble.

At the left hand side of the panel 10, a fly or flap 30 is turned back to present a straight vertical edge 32 behind which the left hand edge of the staff paper 24 is slid. On this fly or flap 30 there are means, not necessarily but ordinarily achieved by printing, to indicate and name the staff lines and spaces as at 34 and 36, corresponding exactly in vertical spacing with the spacing of the staff lines and spaces on the staff paper 24. This is conveniently achieved by referencing both to the bottom edge 12 of the panel 10. Since staff paper 24 placed in the holder will commonly rest along with the panel 10 on the same support, such as a music rack, the vertical alignment of the staff lines 34 and 36 on the paper 24 and the staff lines 38 and 40 on the flap 30 will be more or less automatic.

The staff lines 28 and 40 are fanned out as at 42 and 44 to enable the naming thereof in enlarged lettering this simple expedient having been found to speed recognition dramatically. The spaces in each clef on the flap 30 are also named adjacent to the edge 32, preferably inside the clef signature so that the eye will not necessarily see the line and space names in the same glance thus preventing confusion in the reader's mind. The flap 30 also carries ledger lines 46 above and below each clef with a corresponding notation of Middle C between the clefs.

The interrelationship of the information on the flap 30 to the critically positioned staff paper 24 will now be evident and extended relationship to the information of the guide sheet 22 will be brought into focus when it is recalled that the guide sheet 22 is arbitrarily chosen to complement the staff paper 24. For example, the illustrated guide sheet 22 provides information to assist in the writing and reading of waltz style music and the staff paper in this instance will have three pulse marks 48 in each measure. The guide sheet is also related to the staff paper in agreement as to the number of measures. The color coding exemplified by the red coloring of the C and $C_7$ chord symbols on the arcuate part of the guide sheet is correlated with the coloring of the chord symbols in the left column of the guide sheet and the same coloring of the measures 1,2,3,4,7,8,11 and 12 of staff paper 24, in the instant staff paper prepared for rock and roll music. The other chord symbols appearing on the chart further carry out the correlation between the guide sheet and the staff paper, in representing the strict chord progression in this pattern of music, namely, identification of the F and $F_7$ chord symbols with the 5th 6th and 10th measures on the staff paper and the G and $G_7$ chord symbols with the 9th measure.

As a variant, the rhythm, pulse or beat marks 48 may be deleted from the lower clef and added to the Treble clef when the lower clef is to be completed by writing in the notation of the chord rhythm or the bass beat. This feature of the invention is, however, ancillary to the functional relevancy of the instructional flap 30 and the staff paper in the important and critical relationship of the staff lines 34, 36, 38 and 40 with the resultant assistance in writing music and facility in reading and playing the written music.

Figure 3:
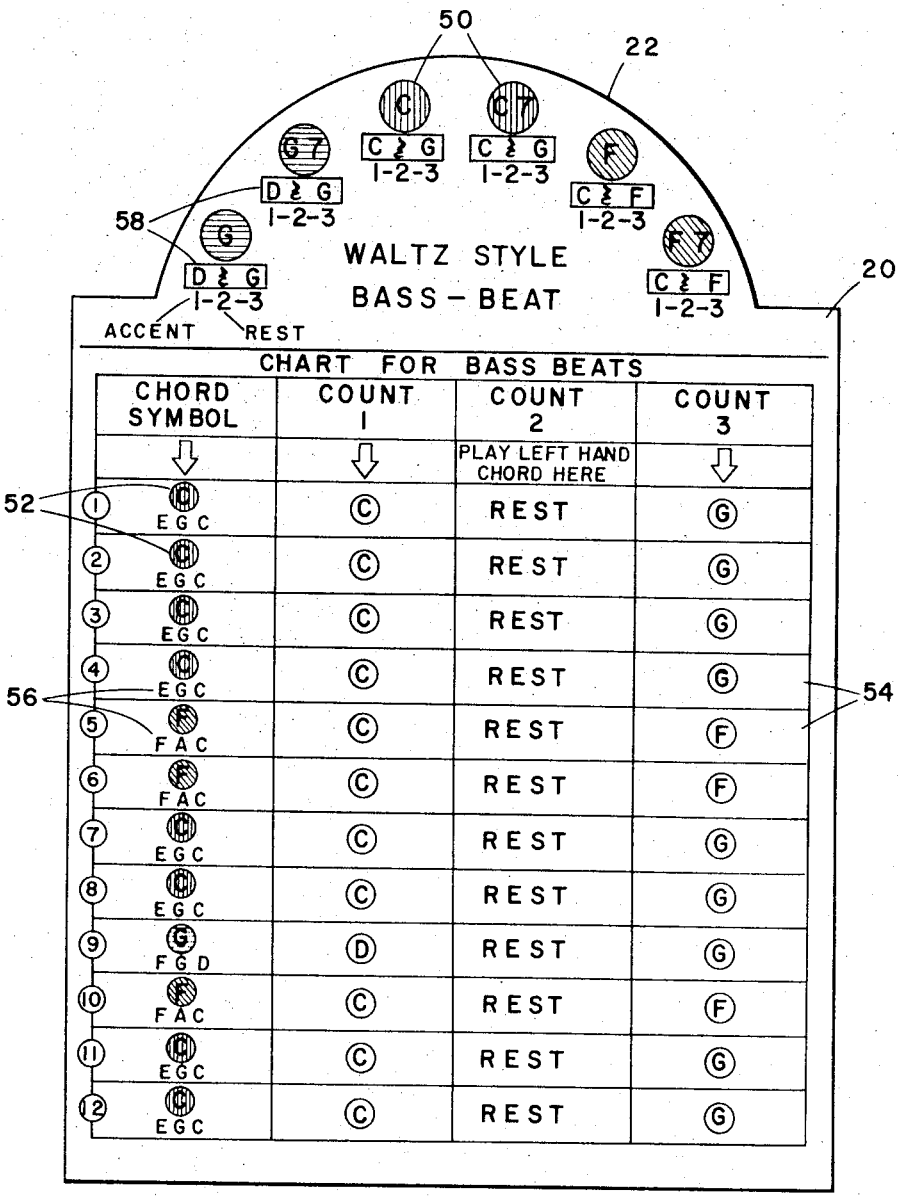
FIG. 3 is a front elevational view of a guide sheet.

Referring now more particularly to FIG. 3, the chart will be seen to be correlated to both the holder-guide or flap 30 and the staff paper 24 in several ways. As mentioned immediately above, the coloring of the measures on the staff paper may be on either the treble or the bass clef and the pulse indications 48 may also be in either clef.

When the user wishes to write the notation of the chord rhythm or bass beat in the lower clef, the chart or guide sheet 20 is employed. In the upper portion 22 chord symbols 50 are reproduced and are color coded to match the same chord symbols 52 in the left hand column on the guide sheet. The guide sheet preferably displays the exact number of spaces 54 required to represent the bars or measures of the piece of music to be written. For example, 12 numbered bars for measures are required for a popular blues or rock music selection, the chord progression in this instance being stereotyped as tonic-tonic-tonic-tonic-Fourth-Fourth-tonic-tonic-Fifth-Fourth-tonic-tonic. For the key of C, the 12 chord symbols illustrated appear in numbered sequence, along with the names of the tones in each chord beneath the chord symbols in the column at the left as at 56. In addition, the Bass beat 58 is boxed underneath each chord symbol 50 at the top of the guide sheet.

It will now be clear how the guide sheet will complement the staff paper especially in writing the strictly structured music referred to above. The staff paper may have the numbered bars or measures 26 colored to agree with the abovementioned color coding and specific chord progression, the coloring being in either the treble or bass clef or in both and the numbering, of course, agreeing exactly on the guide sheet and staff paper.

Obviously the use of three-quarter time or count in the illustrated guide sheet and staff paper is exemplary only and is chosen for simplicity. It is evident that in practice many of the guide sheets and staff papers will indicate 4-4, 5-4 and other counts.

I claim:

1. An aid for reading and writing music, comprising, a panel of sheet material having a bottom edge and having a paper holding and guide flap unitary with said panel along the left edge thereof, said flap folding across a portion of the front of said panel, said flap having a plurality of vertically spaced sets of staff lines with indicia positioned adjacent said staff lines to name said lines and the spaces therebetween and additionally to indicate the positions and names of ledger lines between each staff, each of said staff lines being spaced a predetermined distance from said bottom edge, and a separate replaceable sheet of staff paper having a plurality of vertically spaced sets of staff lines thereon spaced from the bottom edge of said sheet of staff paper substantially the same predetermined distant as said staffs on said flap whereby when said staff paper is placed under said flap, the two sets of staff lines will be in substantial alignment.

2. The aid of claim 1 wherein said flap is approximately equal in length to said left edge of the panel and said flap and sheet of staff paper have an equal number of sets of staff lines.

* * * * *